(12) United States Patent
Verrat et al.

(10) Patent No.: US 9,221,393 B2
(45) Date of Patent: Dec. 29, 2015

(54) ILLUMINATED GLAZING FOR VEHICLE

(71) Applicant: SAINT-GOBAIN GLASS FRANCE, Courbevoie (FR)

(72) Inventors: Adele Verrat, Villers sur Coudun (FR); Pascal Bauerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/391,553

(22) PCT Filed: Mar. 26, 2013

(86) PCT No.: PCT/FR2013/050649
§ 371 (c)(1),
(2) Date: Oct. 9, 2014

(87) PCT Pub. No.: WO2013/153303
PCT Pub. Date: Oct. 17, 2013

(65) Prior Publication Data
US 2015/0078020 A1 Mar. 19, 2015

(30) Foreign Application Priority Data

Apr. 10, 2012 (FR) ...................... 12 53254

(51) Int. Cl.
*F21V 9/00* (2015.01)
*B60Q 3/02* (2006.01)
(Continued)

(52) U.S. Cl.
CPC ........ *B60Q 3/0213* (2013.01); *B32B 17/10036* (2013.01);
(Continued)

(58) Field of Classification Search
CPC .................. B32B 17/10036–17/10541; B60Q 1/26–1/326; B60Q 3/002–3/0216; G02B 6/0073; G02B 6/0088; G02B 6/0095
USPC ......... 362/487, 493–497, 501–506, 509–511, 362/520–522, 540, 543–545, 549
See application file for complete search history.

(56) References Cited

FOREIGN PATENT DOCUMENTS

| DE | 102 04 359 | 10/2002 |
|---|---|---|
| DE | 103 20 614 | 12/2004 |
| DE | 20 2011 105583 | 12/2011 |
| EP | 1 004 433 | 5/2000 |

(Continued)

OTHER PUBLICATIONS

International Search Report issued for International Application No. PCT/FR2013/050649, dated Jun. 18, 2013.

*Primary Examiner* — Jason Moon Han
(74) *Attorney, Agent, or Firm* — Pillsbury Winthrop Shaw Pittman LLP

(57) ABSTRACT

A vehicle lighting glazing, includes first and second transparent sheets each having a first face, a second face and a rim; a lamination separator in contact with the second face of the first sheet and with the first face of the second sheet, one or more light-emitting diode modules (LED modules) each including light-emitting diodes (LEDs) fixed onto a support, the modules being positioned so that the emitting face of the LEDs is facing the rim of the first sheet, and a light extraction element, wherein the second sheet extends beyond the first sheet, at least in the parts of the edge of the glazing where the LED modules are housed, so as to create, on the first face of the second sheet or on a coating covering this face, an area for receiving a bead of glue intended to fix the glazing to the bodywork of the vehicle.

20 Claims, 2 Drawing Sheets

Figure 1:
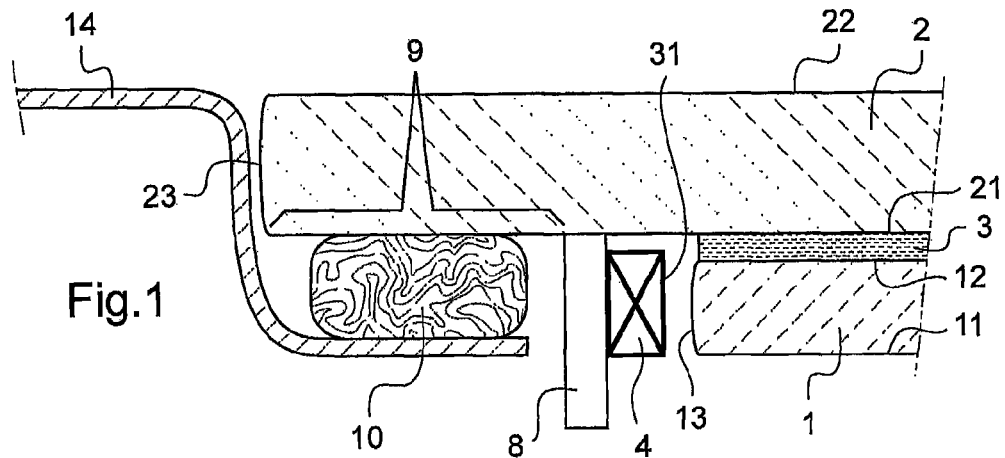

(51) Int. Cl.
  *B32B 17/10* (2006.01)
  *B60Q 1/26* (2006.01)
  *F21V 8/00* (2006.01)

(52) U.S. Cl.
  CPC ..... *B32B 17/10293* (2013.01); *B32B 17/10541* (2013.01); *B32B 17/10761* (2013.01); *B60Q 1/268* (2013.01); *G02B 6/0068* (2013.01); *G02B 6/0073* (2013.01); *G02B 6/0088* (2013.01); *G02B 6/0095* (2013.01)

(56) References Cited

FOREIGN PATENT DOCUMENTS

| | | |
|---|---|---|
| FR | 2 955 539 | 7/2011 |
| FR | 2 978 379 | 2/2013 |
| FR | 2 980 833 | 4/2013 |
| WO | WO 00/53410 | 9/2000 |
| WO | WO 2005/063526 | 7/2005 |
| WO | WO 2010/049638 | 5/2010 |
| WO | WO 2010/049639 | 5/2010 |
| WO | WO 2011/092420 | 8/2011 |

ILLUMINATED GLAZING FOR VEHICLE

CROSS-REFERENCE TO RELATED APPLICATIONS

This application is the U.S. National Stage of PCT/FR2013/050649, filed Mar. 26, 2013, which in turn claims priority to French Application No. 1253254, filed Apr. 10, 2012. The contents of all of these applications are incorporated herein by reference in their entirety.

The present invention relates to a lighting glazing for vehicles, in particular a lighting glazing that forms part of the roof of a motor vehicle.

It is known practice to incorporate light-emitting diode modules (LED modules) at the edge of single-sheet or laminated glazing units, in such a way that the light emitted by the LEDs enters via the rim of a sheet of glass and is guided thereby as far as a diffusing element which extracts the light from the waveguide and diffuses it toward the interior or the exterior of the vehicle (see for example the international applications WO 2010/049638, WO 2010/049639, WO 2011/092419 and WO 2011/092420 and the French application No. 1157011 filed on Jul. 29, 2011 and not yet published at the time of filing of this application).

The light output of such glazing units lit via the rim does not generally exceed 10% because of the light losses due to the absorption by the glass acting as waveguide and/or by the materials in proximity to the light source, such as the encapsulation material (generally carbon black-filled polyurethane), the bead of glue used to bond the glazing to the bodywork of the vehicle or the primer under this bead of glue.

When the lit glazing units of the prior art are motor vehicle roofs, the LED modules are almost always located in the "wet zone", that is to say separated from the internal space of the vehicle by the bead of glue by which the roof is fixed non-removably to the bodywork of the vehicle. This positioning in the wet zone requires a sealing system that is effective and has little bulk. The LED modules are therefore either encapsulated or housed in fairly complex watertight housing systems described for example in the international applications WO 2011/092419 and WO 2011/092420 and the French application No. 1157011 filed on Jul. 29, 2011.

However, such mounting systems render the replacement of the LED modules difficult for LEDs housed in housings, even impossible for the encapsulated LED modules.

The aim of the present invention is to resolve the above-mentioned problems, and in particular that of the difficulty or impossibility of replacing the encapsulated LEDs, by making the modules accessible from the interior of the vehicle. The positioning in a "dry zone" of the LED modules that is obtained by virtue of the present invention

- renders the protection of the LED modules from moisture by an efficient sealing system superfluous,
- makes it thus possible to eliminate certain absorbent materials (encapsulation, bead of glue, primer) in proximity to the LEDs, and
- brings the LEDs closer to the center of the glazing and the light extraction means, thus reducing the light absorption by the sheet of glass which acts as waveguide (hereinafter called "first sheet").

In its French application No. 1158720 filed on Sep. 29, 2011 and not yet published at the time of filing of this application, the Applicant proposes the use of a waveguide making it possible to move the LEDs toward the interior of the vehicle, in the dry zone. The use of this waveguide however entails undesirably lengthening the optical path to be traveled by the light.

The present invention is based on the idea of moving the rim of the waveguide sheet lit by the LEDs, hereinafter called "light injection rim" or, simply, "injection rim", toward the center of the glazing as far as the dry zone. In other words, in the present invention, the bead of glue fixing the glazing to the bodywork of the vehicle is, at least on a part of the edge of the glazing, in a position that is peripheral relative to the injection rim. This means that, in this part where the bead of glue is peripheral relative to the injection rim, the weight of the glazing is borne not by a laminated structure but solely by the non-lit second sheet "bared" by the shortening of the first sheet and by the movement of the injection rim thereof toward the center of the glazing.

The first subject of the present invention is thus a lighting glazing for a vehicle, notably a glazed roof for a motor vehicle, comprising

- a first transparent sheet of glass with a first main face, a second main face and a rim;
- a second transparent sheet of glass with a first main face, a second main face and a rim;
- a lamination separator in adhesive contact with the second main face of the first sheet and with the first main face of the second sheet,
- one or more light-emitting diode modules (LED modules) each comprising a plurality of light-emitting diodes (LEDs) and associated electronic components fixed onto a support, for example a printed circuit board (PCB), the modules being positioned in such a way that the emitting face of the LEDs is facing the rim of the first sheet of glass in such a way as to inject the light into this first sheet which then acts as waveguide,
- a light extraction element, preferably situated on one of the main faces of the first sheet of glass, said glazing being characterized in that the second sheet of glass extends beyond the first sheet of glass, at least in the parts of the edge of the glazing where the LED modules are housed, so as to create, on the first main face of the second sheet of glass or on a coating covering this face, an area for receiving the bead of glue, peripheral relative to the LED modules, which is sufficiently wide and, consequently, suitable for receiving a bead of glue intended to fix the glazing to the bodywork of the vehicle.

The glazing of the present invention is a laminated glazing comprising at least two single sheets glued to one another in a known manner by means of the lamination separator. It is important to note that, in the description hereinbelow of the glazing, the term "first sheet" will always designate the sheet of glass lit at its rim (injection rim) by the light source or sources. The first sheet or lit sheet is preferably the one in contact with the interior of the vehicle. The second sheet of glass is consequently preferably the one in contact with the outside of the vehicle.

Each of the two sheets of the glazing of the present invention has a rim and two main faces. The face intended to be oriented toward the interior of the passenger compartment of the vehicle will be called first main face and the one which will be turned toward the outside of the passenger compartment of the vehicle will be called second main face.

The first sheet of glass is therefore the one lit by LEDs whose emitting faces are facing the rim of said sheet, in such a way as to inject the light into the first sheet which thus acts as waveguide. Obviously, the first sheet is not necessarily lit over all of its circumference and the term "injection rim" denotes only the parts of the rim of the first sheet against which the LED modules are placed.

In the present invention, all the rim of the first sheet is not necessarily in the "dry zone", but all the "injection rim", that is to say all the parts of the rim of the first sheet against which the LED modules are placed, is in the dry zone, separated from the wet zone by the bead of glue when the glazing is mounted on a vehicle.

The area for receiving the bead of glue is therefore a free area on the first face of the second sheet of glass which is in a position peripheral relative to the LED module(s). The adjective "free" does not however mean that the bead of glue will necessarily be glued onto the bare surface of the glass. For safety reasons, it is in fact preferable to encapsulate the free edge of the second sheet, before applying the bead of glue, with a coating. When such a coating is present, the area for receiving the bead of glue is then situated on this coating.

It is also possible to envisage having the lamination separator cover all the first surface of the second sheet and therefore extend as far as the edge thereof even in the areas where it extends beyond the first sheet. The area for receiving the bead of glue is then situated on the lamination separator which forms a coating covering the first face of the second sheet.

The area for receiving the bead of glue can therefore be, for example
- a bare glass surface, or
- a glass surface coated with an appropriate encapsulation material, such as carbon black-filled polyurethane, or
- a glass surface coated with a polymer film, or
- a glass surface covered with the lamination separator, or
- a glass surface covered both with the lamination separator, in turn coated with the encapsulation material.

Together, these coatings covering the first face of the second sheet at its edge, in other words in the area for receiving the bead of glue, advantageously have a thickness at most equal to 5 mm, preferably less than 4 mm, in particular less than 3 mm and particularly preferably less than 2 mm.

This area for receiving the bead of glue—whether on the bare surface of the glass or on the coating covering this surface—must be sufficiently wide to receive the bead of glue intended to fix the glazing in a sealtight and non-removable manner to the bodywork of the vehicle and to delimit the "dry zone" within the "wet zone" in communication with the outside atmosphere. This width obviously depends on the size of the glazing and on the dimensions of the bead of glue. It is typically between 20 mm and 100 mm, preferably between 25 mm and 60 mm, and in particular between 30 and 50 mm.

Although the bead of glue does not in principle necessarily form part of the glazing of the present invention, it is possible to envisage having the glazing either delivered with a primer coat and/or with the bead of glue. In one embodiment of the invention, the glazing consequently also comprises a primer coat and/or a bead of glue applied to the free area for receiving the bead of glue, in a position peripheral relative to the LED modules.

The second sheet of glass of the glazing therefore extends beyond the first sheet at least in the parts of the edge where the LED modules are housed. It can, however, extend beyond the first sheet in much more extensive areas of the edge. For example, when the glazing comprises one or more LED modules on two opposite edges, the rim of the first sheet can be set back relative to the edge of the second sheet over the entire length of these two opposite edges. It would also be possible to envisage having the rim of the first sheet set back relative to the edge of the second sheet over the entire circumference of the glazing according to the invention. For obvious mechanical strength reasons, the latter embodiment does not however correspond to a preferred embodiment of the glazing.

In the different embodiments above, the distance between the rim of the second sheet and the rim of the first sheet, set back relative to the second sheet, is advantageously at least equal to 40 mm, preferably between 50 and 100 mm, in particular between 55 and 80 mm, at least in the parts of the edge where the LED modules are housed.

In the parts of the edge where there are no LED modules, the distance between the rim of the first sheet and the rim of the second sheet is advantageously small, generally less than 30 mm, preferably less than 20 mm, in particular less than 10 mm. In a particularly advantageous embodiment, this distance between the two rims is zero.

The parts where the edges are single-glazed constitute a glazing embrittlement zone, because the second sheet is not a tempered sheet. In the event of an accident and shattering of the glass, there is then a risk of the appearance of large cutting areas which are potentially hazardous for the passengers.

Moreover, in particular for the embodiment where the glazed roof is borne totally by the second sheet of glass, the central part of the roof could be separated from the bodywork in the event of an accident and the function preventing the ejection of the passengers would then be lost.

To prevent the formation of such cutting areas as well as the separation of the roof in the event of an accident, the glazing of the present invention preferably comprises an encapsulation element in the form of a coating covering at least the rim of the second sheet of glass and the area for receiving the bead of glue, that is to say the part where the second sheet extends beyond the first sheet and the LEDs. This coating preferably has a thickness at most equal to 5 mm, more preferably less than 4 mm, and in particular less than 3 mm, even less than 2 mm.

In one embodiment, this encapsulation coating extends, on the first main face of the second sheet of glass, beyond the free area for receiving the bead, as far as the lamination separator, that is to say between the LED modules and the first main face of the second sheet. Its thickness is then substantially equal to that of the lamination separator.

In another embodiment, the encapsulation element is not placed end to end with the lamination separator, but covers the lamination separator which covers all or part of the first main face of the second sheet.

Finally, in yet another embodiment of the glazing of the present invention, the LED modules are fixed directly onto the first main face of the second sheet and the encapsulation element extends simply as far as the LED modules, but not under them.

The positioning of the LED modules in the dry zone eliminates any need for sealing. Consequently, the LED modules are preferably not encapsulated by the encapsulation element, but are mounted freely in proximity to the rim of the first sheet in such a way that the emitting faces of the LEDs are facing this rim (injection rim).

The LED modules can advantageously be protected by a removable cover, easy to remove and to be repositioned in such a way as to allow the LEDs to be replaced in the event of failure. After the glazing has been mounted on the vehicle, this cover can in turn be covered by the trim or else it can be visible by being situated outside the area covered by the trim.

Because of the absence of an encapsulation material that risks blocking the space between the emitting face of the LED and the injection rim, there is no longer any need to glue these two elements together by means of a transparent glue.

The disappearance of the constraints resulting from a position in a wet area also makes it possible to use top-emitting LEDs which are available with high power levels, in varied colors and at prices lower than those of side-emitting LEDs.

The materials used for the sheets of glass, the lamination separator and the encapsulation are familiar to those skilled in the art and commonly used in the field of motor vehicle glazings. The sheets of glass are preferably mineral glass. As is known, the second sheet of glass in contact with the outside is preferably tinted glass, for example made of Vénus®, TSA3+ or TSA4+ glass marketed by the Applicant, whereas the first sheet (waveguide) advantageously consists of a very clear, not very absorbent, glass, such as the Planilux® glass also marketed by the Applicant.

The lamination separator is typically a transparent thermoplastic polymer exhibiting good properties of adhesion to the glass such as poly(vinyl butyral) (PVB), certain thermoplastic polyurethanes (TPU) or the copolymers of ethylene and vinyl acetate (EVA). PVB is particularly preferred.

Another subject of the present invention is a vehicle, preferably a motor vehicle, comprising a lighting glazing according to the invention. This lighting glazing preferably forms part of the roof of the vehicle.

Figure 2:
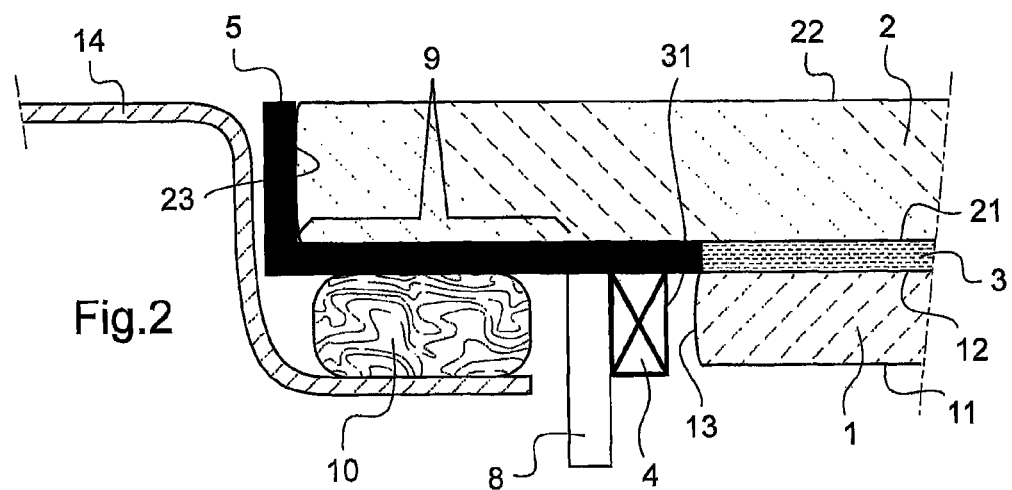
Figure 3:
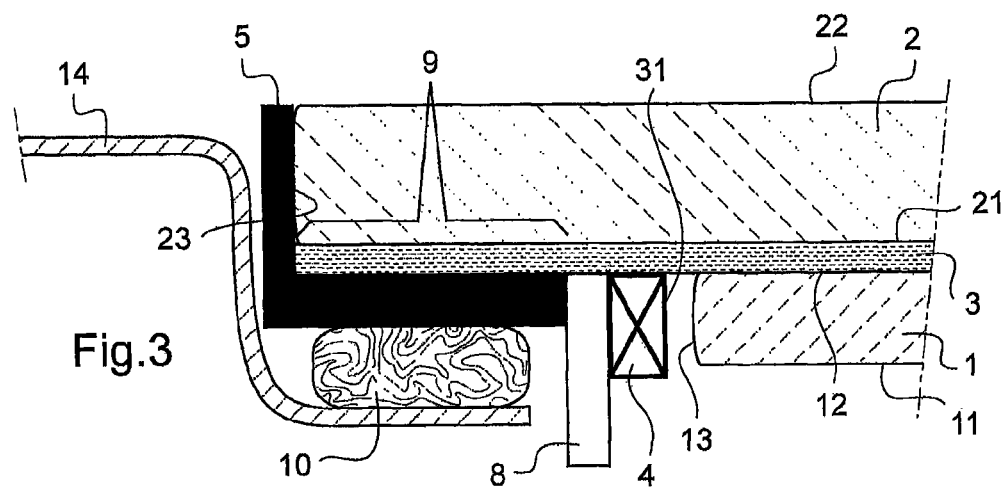
Figure 4A:
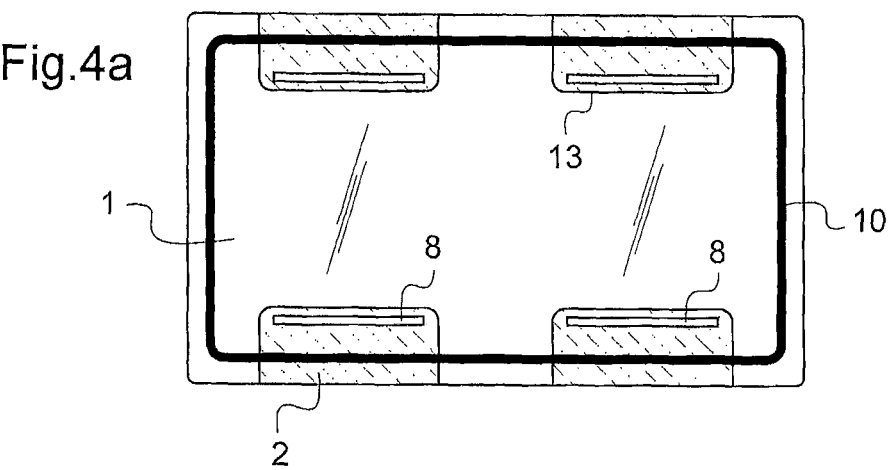
Figure 4B:
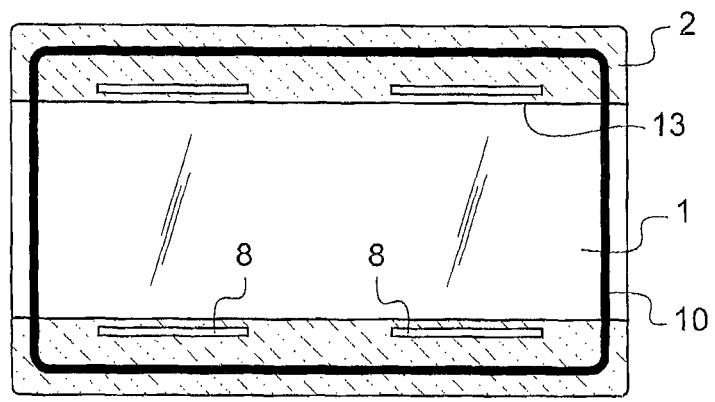
Figure 4C:
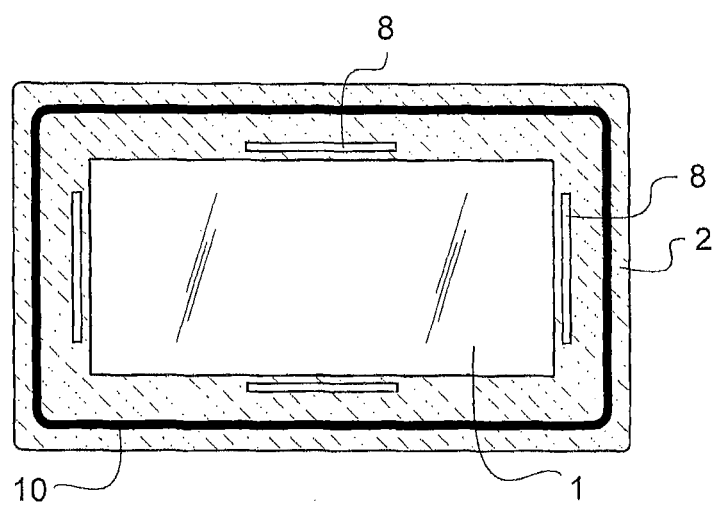

The invention is now described in more detail using a few embodiments represented in the appended figures in which FIG. 1 shows a cross section of the edge of a first embodiment of a glazing according to the invention, FIG. 2 shows a cross section of the edge of a second embodiment of a glazing according to the invention, FIG. 3 shows a cross section of the edge of a third embodiment of a glazing according to the invention, FIGS. 4a, 4b and 4c schematically represent three embodiments of the glazing of the invention seen from below.

The embodiment represented in FIG. 1 corresponds to the invention in its simplest form. On the surround of a laminated glazing formed by a first sheet of glass 1 and a second sheet of glass 2, glued to one another by means of a lamination separator, there is arranged a light-emitting diode module (LED module) 8 with an LED whose emitting face 31 is facing the rim 13 of the first sheet. The first main surface 11 of the first sheet of glass 1 and the second main surface 22 of the second sheet of glass 2 are in contact respectively with the interior and the outside of the vehicle. The laminated glazing is glued to the bodywork 14 of the vehicle using a bead of glue 10. This bead of glue 10 is in direct contact with the first main surface 21 of the second sheet in a free area 9 for receiving the bead of glue. This area 9 and the bead of glue 10 are therefore located in a position that is peripheral relative to the LED module 8. The latter is thus in a "dry zone", insulated from the outside environment ("wet zone"), by the bead of glue 10. The LED module can be removed from the sight of the passengers of the vehicle by the trim and/or a removable cover (not represented). There is no need to seal the LED module in a moisture-proof manner.

The glazing represented in FIG. 2 differs from that of FIG. 1 mainly by the presence of an encapsulation element 5, in the form of a thin coating, which covers the rim 23 of the second sheet of glass 2 and the free area 9 for receiving the bead of glue, and extends as far as the lamination separator 3. Over the entire area where the encapsulation element is in contact with the first main surface 21 of the second sheet, it has substantially the same thickness as the lamination separator 3. The LED module and the bead of glue 10 are in contact, not with the bare surface of the first main face 21 of the second sheet 2, but with the encapsulation element 5. The encapsulation element serves mainly to prevent, in the event of an accident and shattering of the glass, the formation of long cutting edges on the second sheet of glass 2.

In the third embodiment of the glazing represented in FIG. 3, the lamination separator 3 extends as far as the edge of the first main surface 21 of the second sheet and thus covers the entire free area 9 for receiving the bead of glue. This area is also covered by the encapsulation element 5 which is here thicker than in FIG. 2. The LED module 8 backs up against the encapsulation element.

FIGS. 4a, b and c represent three embodiments of a glazing according to the invention, seen from below, the bead of glue being applied to the bottom face of the glazing. The three embodiments are distinguished essentially by the shape of the first sheet of glass 1.

In FIG. 4a, this first sheet of glass 1 comprises four cut-outs in which the four LED modules 8 are housed, each module facing the rim 13 of the first sheet. The second sheet of glass 2 is rectangular and therefore extends beyond the first sheet 1 at the four cut-outs. The bead of glue 10 is in a position that is peripheral relative to the set of LED modules 8. When this laminated glazing is glued to the vehicle by means of the bead of glue 10, its weight will be borne mainly by the laminated structure comprising the first and second sheets of glass (1,2).

In FIG. 4b, the first sheet of glass 1 is rectangular, but is narrower than the second sheet of glass 2. The latter therefore extends beyond the first sheet of glass on two opposite edges. Four LED modules 8 are installed on the bottom face (first main face) of the second sheet of glass facing the rim 13 of the first sheet of glass. In this embodiment, the weight of the glazing, once glued to the bodywork, will largely be borne by the non-laminated edges of the second sheet of glass.

Finally, in the third embodiment, represented in FIG. 4c, the second sheet of glass 2 extends beyond the first sheet of glass over the entire circumference of the glazing. The bead of glue 10 is in contact only with the first main face of the second sheet of glass and, after bonding to the bodywork, the weight of the glazing will be borne only by the second sheet of glass.

The invention claimed is:

1. A lighting glazing for a vehicle, comprising:
   a first transparent sheet of glass with a first main face, a second main face and a rim;
   a second transparent sheet of glass with a first main face, a second main face and a rim;
   a lamination separator in adhesive contact with the second main face of the first sheet and with the first main face of the second sheet;
   one or more light-emitting diode modules each comprising a plurality of light-emitting diodes and associated electronic components fixed onto a support, the one or more light-emitting diode modules being positioned in such a way that an emitting face of the light-emitting diodes is facing the rim of the first transparent sheet of glass, and
   a light extraction element,
   wherein the second transparent sheet of glass extends beyond the first transparent sheet of glass, at least in a part of an edge of the glazing where the one or more light-emitting diode modules are housed, so as to create, on the first main face of the second transparent sheet of glass or on a coating covering the first main face of the second transparent glass, an area for receiving a bead of glue, peripheral relative to the one or more light-emitting diode modules, the bead of glue adapted to fix the glazing to a bodywork of the vehicle.

2. The lighting glazing as claimed in claim 1, wherein the area for receiving the bead of glue has a width of between 20 mm and 100 mm.

3. The lighting glazing as claimed in claim 2, wherein the width is between 25 mm and 60 mm.

4. The lighting glazing as claimed in claim 3, wherein the width is between 30 and 50 mm.

5. The lighting glazing as claimed in claim 1, further comprising the bead of glue applied to the area for receiving the bead of glue, in a position peripheral relative to the one or more light-emitting diode modules.

6. The lighting glazing as claimed in claim 1, further comprising an encapsulation element in the form of a coating covering at least the rim of the second transparent sheet of glass and the area for receiving the bead of glue.

7. The lighting glazing as claimed in claim 6, wherein said coating has a thickness at most equal to 5 mm.

8. The lighting glazing as claimed in claim 1, wherein the encapsulation element extends, on the first main face of the second transparent sheet of glass, beyond the area for receiving the bead of glue, as far as the lamination separator.

9. The lighting glazing as claimed in claim 8, wherein, in the area beyond the area for receiving the bead of glue, a thickness of the encapsulation element is substantially equal to that Of the lamination separator.

10. The lighting glazing as claimed in claim 1, wherein the one or more light-emitting diode modules are not encapsulated by the encapsulation element.

11. The lighting glazing as claimed in claim 1, wherein the one or more light-emitting diode modules are protected by a removable cover.

12. The lighting glazing as claimed in claim 1, wherein, in the part of the edge where the one or more light-emitting diode modules are housed, a distance between the rim of the first transparent sheet of glass and the rim of the second transparent sheet is at least equal to 40 mm.

13. The lighting glazing as claimed in claim 12, wherein the distance is between 50 and 100 mm.

14. The lighting glazing as claimed in claim 1, wherein the light extraction element is arranged on one of the first and second main faces of the first transparent sheet of glass.

15. A vehicle, comprising a lighting glazing as claimed in claim 1.

16. The vehicle as claimed in the claim 15, wherein the lighting glazing forms part of the roof of the vehicle.

17. The vehicle as claimed in claim 15, wherein the vehicle is a motor vehicle.

18. A lighting glazing for a vehicle, comprising:
a first transparent sheet with a first main face, a second main face and a rim;
a second transparent sheet with a first main face, a second main face and a rim;
a lamination separator in adhesive contact with the second main face of the first transparent sheet and with the first main face of the second transparent sheet;
a light-emitting diode module comprising a plurality of light-emitting diodes fixed onto a support, the light-emitting diode module being positioned in such a way that an emitting face of the light-emitting diodes is facing the rim of the first transparent sheet, and
a light extraction element to extract light emitted by the plurality of light-emitting diodes,
wherein at least part of a periphery of the second transparent sheet extends beyond at least part of a periphery of the first transparent sheet so that the first main face of the second transparent sheet has a portion, located between said part of the periphery of the second transparent sheet and said part of the periphery of the first transparent sheet, that is not laminated with the first transparent sheet, said portion comprising a first area that receives the light-emitting diode module and a second area, between the first area and said at least part of the periphery of the second transparent sheet, for receiving a bead of glue adapted to fix the glazing to a bodywork for the vehicle.

19. The lighting glazing as claimed in claim 18, wherein the second area for receiving the bead of glue has a width of between 20 mm and 100 mm.

20. The lighting glazing as claimed in claim 18, further comprising an encapsulation element in the form of a coating covering at least the rim of the second transparent sheet of glass and the area for receiving the bead of glue.

* * * * *